United States Patent
Park

(10) Patent No.: US 11,259,290 B2
(45) Date of Patent: Feb. 22, 2022

(54) METHOD AND DEVICE FOR TRANSMITTING UPLINK DATA

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/758,168

(22) PCT Filed: Feb. 13, 2019

(86) PCT No.: PCT/KR2019/001770
§ 371 (c)(1),
(2) Date: Apr. 22, 2020

(87) PCT Pub. No.: WO2019/160332
PCT Pub. Date: Aug. 22, 2019

(65) Prior Publication Data
US 2020/0344747 A1    Oct. 29, 2020

(30) Foreign Application Priority Data

Feb. 14, 2018  (KR) .................. 10-2018-0018740
Feb. 11, 2019  (KR) .................. 10-2019-0015479

(51) Int. Cl.
*H04W 72/04*    (2009.01)
*H04W 72/12*    (2009.01)
*H04L 5/00*     (2006.01)

(52) U.S. Cl.
CPC ....... *H04W 72/0413* (2013.01); *H04L 5/0053* (2013.01); *H04W 72/042* (2013.01); *H04W 72/0446* (2013.01); *H04W 72/1268* (2013.01)

(58) Field of Classification Search
CPC ........... H04W 72/0413; H04W 72/042; H04W 72/0446; H04W 72/1268; H04L 5/0053
See application file for complete search history.

(56) References Cited

U.S. PATENT DOCUMENTS

2016/0219613 A1*  7/2016  Lei .................. H04W 72/12
2017/0353272 A1* 12/2017  Takeda ................ H04L 1/16
2018/0027493 A1   1/2018  Li et al.
(Continued)

OTHER PUBLICATIONS

Fujitsu, "On eMMB and URLL Multiplexing", R1-1719616, 3GPP TSG RAN WG1 Meeting #91, Reno, USA, Nov. 27-Dec. 1, 2017, pp. 1-7.

(Continued)

*Primary Examiner* — Ronald B Abelson
(74) *Attorney, Agent, or Firm* — Invenstone Patent, LLC

(57) ABSTRACT

Provided are a method and a device for transmitting uplink data according to uplink cancellation indication information in a next-generation wireless network. A method of a terminal for transmitting uplink data may include: transmitting uplink data on the basis of uplink data resource allocation information; monitoring uplink cancellation indication information on the basis of monitoring configuration information on the uplink cancellation indication information; receiving the uplink cancellation indication information; and suspending the transmission of on-going uplink data on the basis of the uplink cancellation indication information.

15 Claims, 17 Drawing Sheets

(56) References Cited

U.S. PATENT DOCUMENTS

2018/0368117 A1* 12/2018 Ying .................... H04W 72/04
2019/0254067 A1* 8/2019 Al-Imari ............... H04W 74/00

OTHER PUBLICATIONS

Vivo, "Summary of 7.3.3.6 multiplexing data with different transmission durations", R1-1801155, 3GPP TSG RAN WG1 Meeting AH 1801, Vancouver, Canada, Jan. 22-26, 2018, pp. 1-8.
Nokia et al., "Pause-Resume Scheduling for Low Latency Uplink Transmissions", R1-1711003, 3GPP TSG-RAN WG1 NR Ad Hoc #2, Qingdao, P.R. China, Jun. 27-30, 2017, pp. 1-4.
Samsung, "Indication of Preempted Resources in UL", R1-1800459, 3GPP TSG RAN WG1 Meeting AH 1801, Vancouver, Canada, Jan. 22-26, 2018, pp. 1-3.
Vivo, "Multiplexing data with different transmission durations", R1-1717502, 3GPP TSG RAN WG1 Meeting 90bis, Prague, CZ, Oct. 9-13, 2017, pp. 1-10.

* cited by examiner

METHOD AND DEVICE FOR TRANSMITTING UPLINK DATA

CROSS REFERENCE TO RELATED APPLICATIONS

This application is a National Stage Patent Application of PCT International Patent Application No. PCT/KR2019/001770 (filed on Feb. 13, 2019) under 35 U.S.C. § 371, which claims priority to Korean Patent Application Nos. 10-2018-0018740 (filed on Feb. 14, 2018), and 10-2019-0015479 (filed on Feb. 11, 2019), the teachings of which are incorporated herein in their entireties by reference.

TECHNICAL FIELD

The present disclosure relates to methods and apparatuses for transmitting uplink data in a next-generation/5G radio access network (hereinafter, referred to as a new radio, "NR").

BACKGROUND ART

Recently, the 3rd generation partnership project (3GPP) has approved the "Study on New Radio Access Technology", which is a study item for research on next-generation/5G radio access technology (hereinafter, referred to as "new radio" or "NR"). On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

Because the requirements for data rates, latency, reliability, coverage, etc. are different from each other, there is a need for a method for efficiently multiplexing a radio resource unit based on different numerologies from each other (e.g., subcarrier spacing, subframe, Transmission Time Interval (TTI), etc.) as a method for efficiently satisfying each usage scenario requirement through a frequency band constituting any NR system.

DETAILED DESCRIPTION OF THE INVENTION

Technical Problem

It is at least one object of the present disclosure to provide methods of transmitting uplink data according to uplink cancellation indication information in the NR.

Technical Solution

In accordance with one aspect of the present disclosure, a method of a user device or terminal (hereinafter, referred to as "user equipment" or "UE") is provided for transmitting uplink ("UL") data. The method may include: transmitting the UL data based on UL data resource allocation information, monitoring UL cancellation indication information based on monitoring configuration information on the UL cancellation indication information, receiving the UL cancellation indication information, and suspending on-going UL data transmission based on the UL cancellation indication information.

In accordance with another aspect of the present disclosure, a method of a base station is provided for controlling UL data transmission of a UE. The method may include: configuring monitoring configuration information on UL cancellation indication information, transmitting the monitoring configuration information to a UE that is transmitting UL data, and transmitting the UL cancellation indication information based on the monitoring configuration information.

In accordance with further another aspect of the present disclosure, a UE is provided for transmitting UL data. The UE may include: a transmitter transmitting the UL data based on UL data resource allocation information, a controller monitoring UL cancellation indication information based on monitoring configuration information on the UL cancellation indication information and suspending on-going UL data transmission based on the UL cancellation indication information, and a receiver receiving the UL cancellation indication information.

Effects of the Invention

Embodiments of the present disclosure provide methods of transmitting UL data according to UL cancellation indication information in the NR.

BEST MODE FOR CARRYING OUT THE INVENTION

Figure 1:
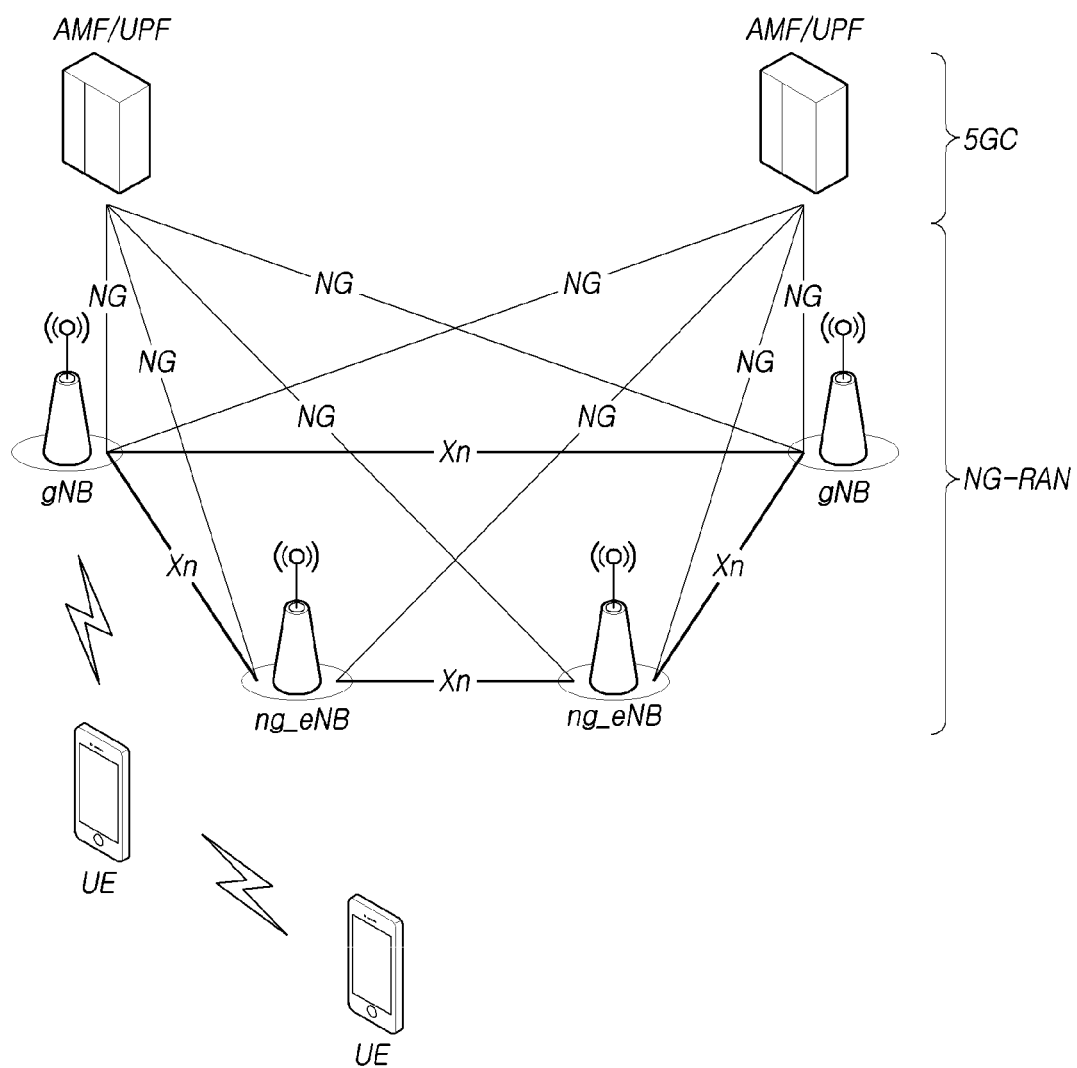
FIG. 1 schematically illustrates an NR wireless communication system in accordance with embodiments of the present disclosure.

Hereinafter, some embodiments of the present disclosure will be described in detail with reference to the accompanying illustrative drawings. In the drawings, like reference numerals are used to denote like elements throughout the drawings, even if they are shown on different drawings. Further, in the following description of the present disclosure, a detailed description of known functions and configurations incorporated herein will be omitted when it may make the subject matter of the present disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the present disclosure. Each of these terminologies is not used to define an essence, order or sequence of a corresponding component but used merely to distinguish the corresponding component from other component(s). In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression. Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as $3^{rd}$ generation partnership project (3GPP), 3GPP2, WiFi, Bluetooth, institute of electrical and electronics engineers (IEEE), international telecommunication union (ITU), or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized. Furthermore, the embodiments may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to data transmission and reception from a UE to a base station, and a downlink (DL) refers to data transmission and reception from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

The 3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology. Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 schematically illustrates an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a cyclic prefix (CP)-OFDM waveform using a cyclic prefix for downlink transmission and uses CP-OFDM or discrete Fourier transform spread (DFT-s)-OFDM for uplink transmission. OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
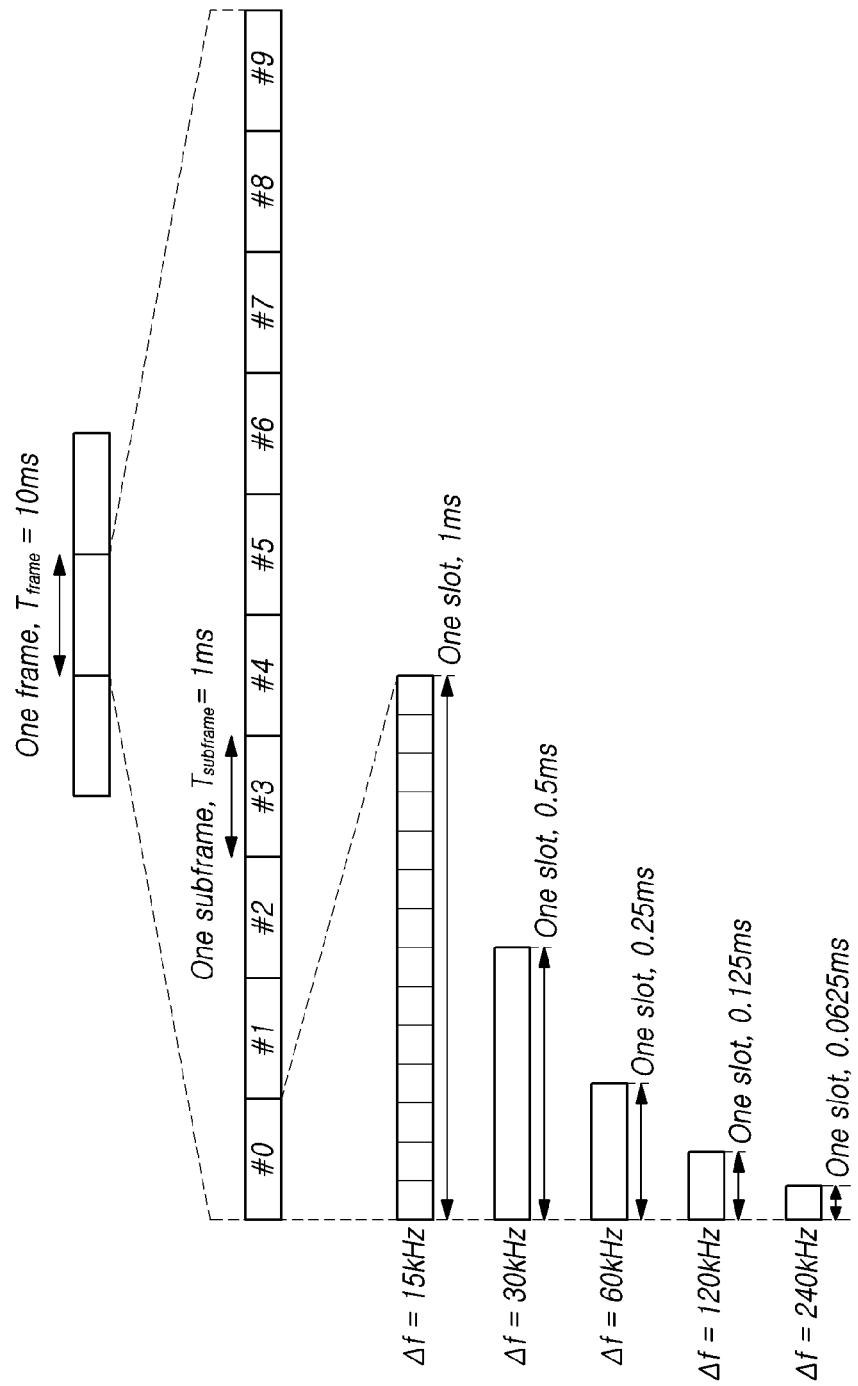
FIG. 2 schematically illustrates a frame structure in an NR system in accordance with embodiments of the present disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and has a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 illustrates a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by instructing, using the SFI, the index of a table configured through UE-specific RRC signaling. Further, the base station may dynamically inform the slot format through downlink control information (DCI) or may statically or quasi-statically instruct the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
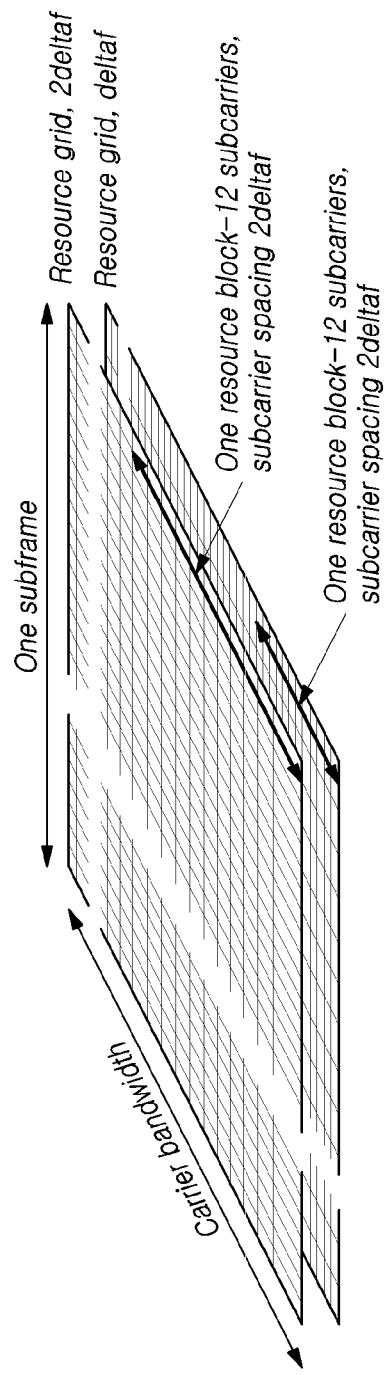
FIG. 3 illustrates resource grids supported by a radio access technology in accordance with embodiments of the present disclosure.

FIG. 3 illustrates resource grids supported by a radio access technology in accordance with embodiments of the present disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
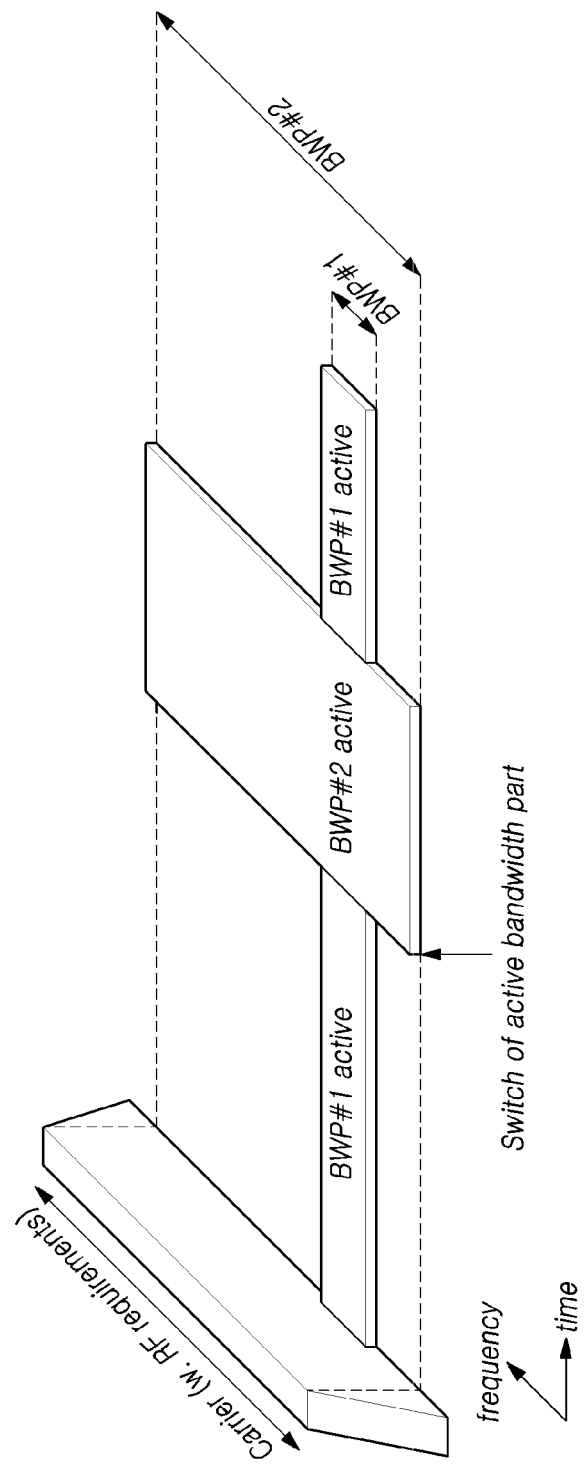
FIG. 4 illustrates bandwidth parts supported by a radio access technology in accordance with embodiments of the present disclosure.

FIG. 4 illustrates bandwidth parts supported by a radio access technology in accordance with embodiments of the present disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
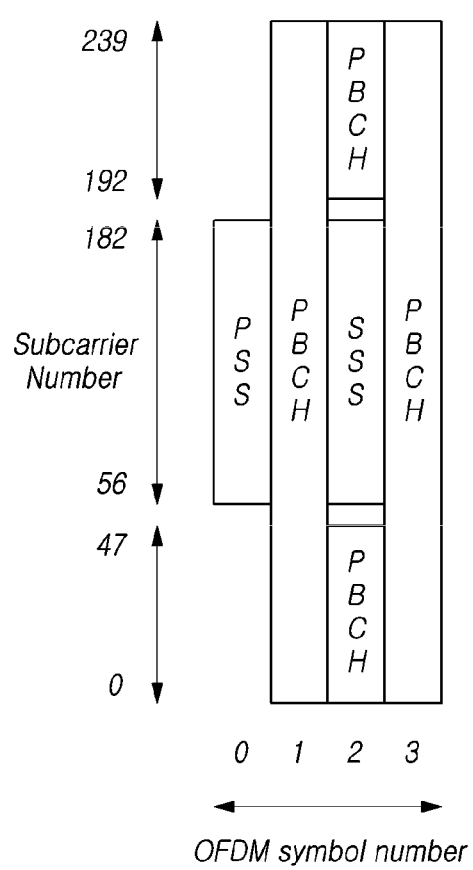
FIG. 5 illustrates an example of a synchronization signal block in a radio access technology in accordance with embodiments of the present disclosure.

FIG. 5 illustrates an example of a synchronization signal block in a radio access technology in accordance with embodiments of the present disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

[73] Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORESET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
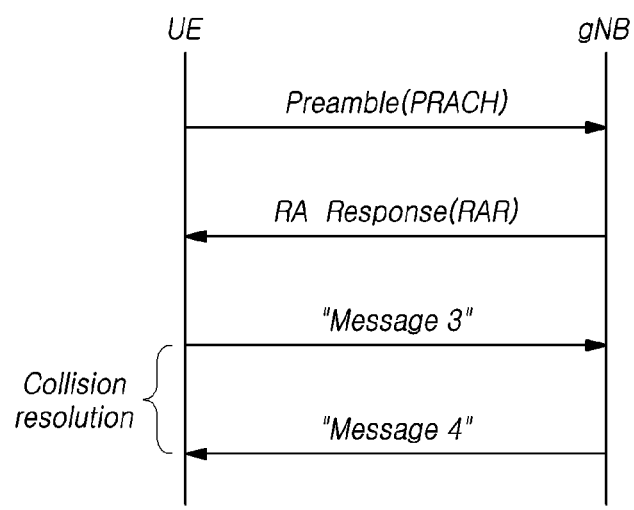
FIG. 6 is a signal diagram for explaining a random access procedure in a radio access technology in accordance with embodiments of the present disclosure.

FIG. 6 illustrates a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
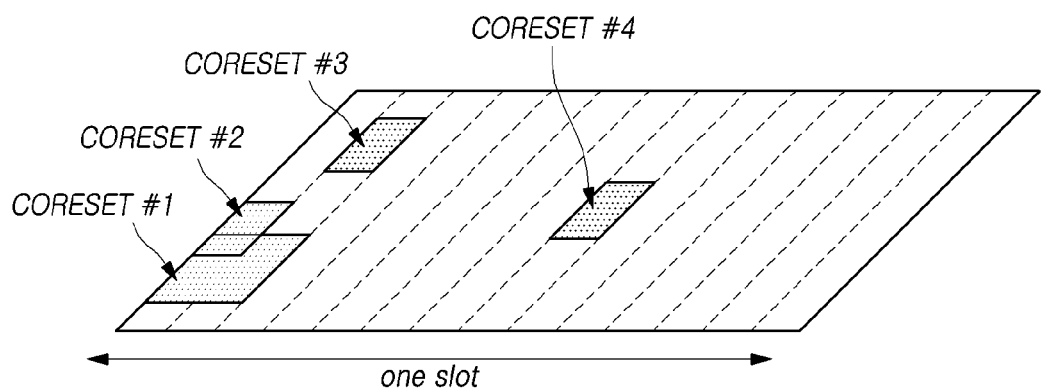
FIG. 7 illustrates CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., instructed, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR(New Radio)

The NR is required to be designed not only to provide an improved data transmission rate but also to meet various QoS requirements for each detailed and specific usage scenario, compared to the LTE/LTE-Advanced. In particular, an enhanced mobile broadband (eMBB), massive machine-type communication (mMTC), and ultra reliable and low latency communication (URLLC) are defined as representative usage scenarios of the NR. In order to meet requirements for each usage scenario, it is required to design the NR to have a more flexible frame structure as compared to the LTE/LTE-Advanced.

Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios over a frequency band provided to an NR system.

To this end, there have been discussions on i) methods of multiplexing numerologies having subcarrier spacing (SCS) values different from one another based on TDM, FDM or TDM/FDM over one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms.

Unlike the LTE, since the subframe of the NR is an absolute reference time duration, a slot and a mini-slot may be defined as a time unit for actual UL/DL data scheduling. In this case, the number of OFDM symbols which constitutes a slot, a value of y, has been defined as y=14 regardless of the numerology.

Therefore, a slot may be made up of 14 symbols. In accordance with a transmission direction for a corresponding slot, all symbols may be used for DL transmission or UL transmission, or the symbols may be used in the configuration of a DL portion+a gap+an UL portion.

Further, a mini-slot has been defined to be made up of fewer symbols than the slot in a numerology (or SCS), and as a result, a short time domain scheduling interval may be configured for UL/DL data transmission or reception based on the mini-slot. Also, a long time domain scheduling interval may be configured for the UL/DL data transmission or reception by slot aggregation.

Particularly, in the case of the transmission or reception of latency critical data, such as the URLLC, when scheduling is performed on a slot basis based on 1 ms (14 symbols) defined in a frame structure based on a numerology having a small SCS value, for example, 15 kHz, latency requirements may be difficult to be satisfied. To this end, a mini-slot made up of fewer OFDM symbols than the slot may be defined. Thus the scheduling for the latency critical data, such as the URLLC, may be performed based on the mini-slot.

Figure 8:
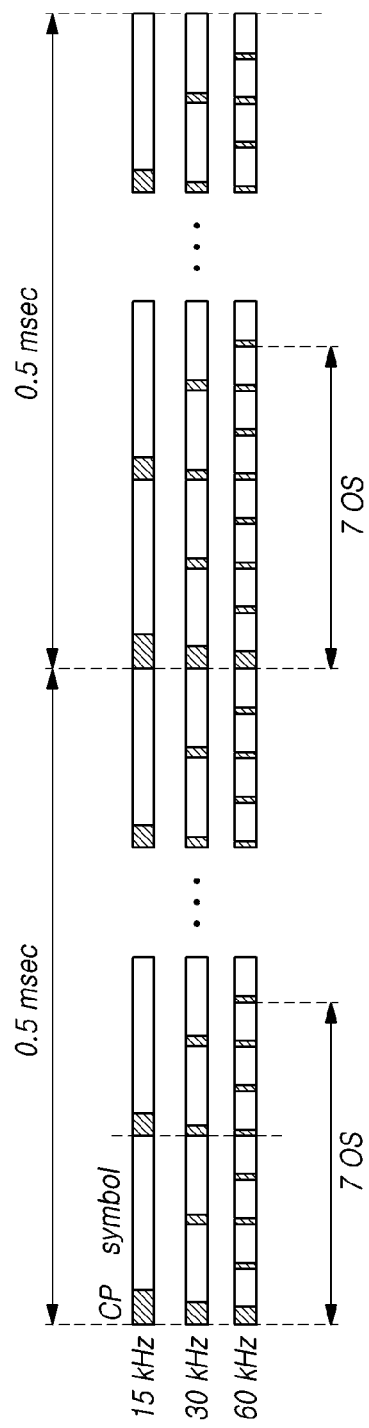
FIG. 8 illustrates an example of symbol level alignment among different subcarrier spacings (SCSs) in accordance with embodiments of the present disclosure.

As described above, it is also contemplated to schedule the data according to the latency requirement based on the length of the slot (or minislot) defined by the numerology by supporting the numerology with the different SCS values in one NR carrier by multiplexing them in the TDM and/or FDM manner. For example, as shown in FIG. 8, when the SCS is 60 kHz, the symbol length is reduced to about ¼ of that of the SCS 15 kHz. Therefore, when one slot is made up of 14 OFDM symbols, the slot length based on 15 kHz is 1 ms whereas the slot length based on 60 kHz is reduced to about 0.25 ms.

Thus, since different SCSs or different TTI lengths from one another are defined in the NR, technologies have been developed for satisfying requirements of each of the URLLC and the eMBB.

PDCCH

In the NR and the LTE/LTE-A system, L1 control information (such as, DL assignment DL control information (DCI), UL grant DCI, and the like) is transmitted and/or received through PDCCH. A control channel element is defined as a resource unit for transmitting a PDCCH, (CCE). In the NR, a control resource set (CORESET) that is a frequency/time resource for PDCCH transmission may be configured for each UE. Further, each CORESET may include one or more search spaces configured with one or more PDCCH candidates for allowing a UE to monitor a PDCCH.

<Wider Bandwidth Operations>

The typical LTE system supports scalable bandwidth operations for any LTE CC (component carrier). That is, according to a frequency deployment scenario, an LTE provider may configure a bandwidth of a minimum of 1.4 MHz to a maximum of 20 MHz in configuring a single LTE CC, and a normal LTE UE supports a transmission/reception capability of a bandwidth of 20 MHz for a single LTE CC.

Figure 9:
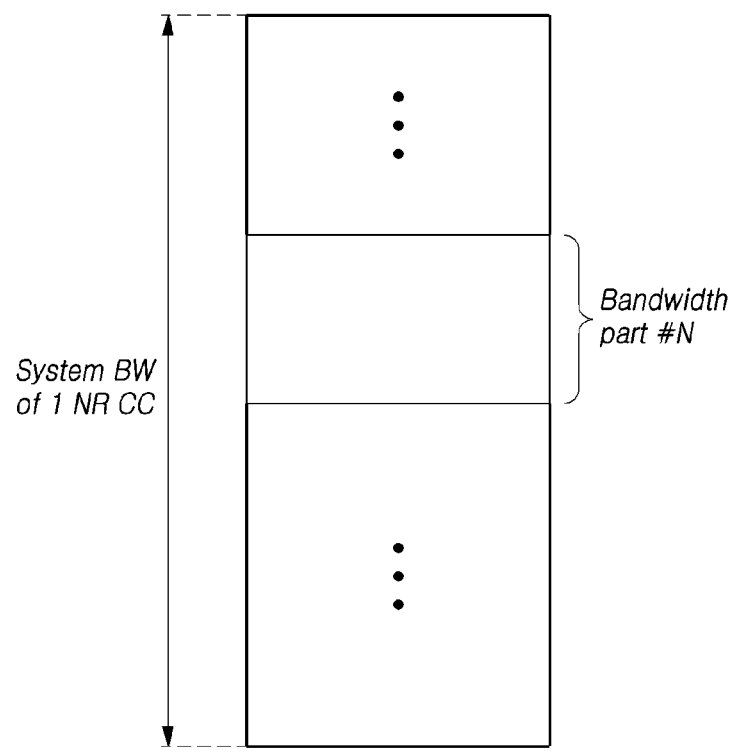
FIG. 9 schematically illustrates a bandwidth part in accordance with embodiments of the present disclosure.

However, the NR is designed to support the UE of NR having different transmission/reception bandwidth capabilities over a single wideband NR CC. Accordingly, it is required to configure one or more bandwidth parts (BWPs) including subdivided bandwidths for an NR CC as shown FIG. 9, thereby supporting a flexible and wider bandwidth operation through configuration and activation of different bandwidth parts for respective UEs.

Specifically, one or more bandwidth parts may be configured through a single serving cell configured for a UE in NR, and the UE is defined to activate one downlink (DL) bandwidth part and one uplink (UL) bandwidth part to use the same for uplink/downlink data transmission/reception in the corresponding serving cell. In addition, in the case where a plurality of serving cells is configured for the UE (i.e., the UE to which CA is applied), the UE is also defined to activate one downlink bandwidth part and/or one uplink bandwidth part in each serving cell to use the same for uplink/downlink data transmission/reception by utilizing radio resources of the corresponding serving cell.

Specifically, an initial bandwidth part for an initial access procedure of a UE may be defined in a serving cell; one or more UE-specific bandwidth parts may be configured for each UE through dedicated RRC signaling, and a default bandwidth part for a fallback operation may be defined for each UE.

It is possible to define simultaneously activating and using a plurality of downlink and/or uplink bandwidth parts according to the capability of the UE and the configuration of the bandwidth parts in a serving cell. However, NR rel-15 defined activating and using only one downlink (DL) bandwidth part and one uplink (UL) bandwidth part at a time.

A Discontinuous Transmission Indication for DL

A method of giving an indication for discontinuous transmission through a group common PDCCH has been defined, as a multiplexing method for DL data of different transmission durations defined in the NR. That is, when a UE receives indication information for discontinuous transmission, the UE becomes able to identify the presence or absence of preemption for data transmission of any other UE for a part time/frequency resource of a PDSCH transmission resource allocated for the corresponding UE according to the indication information.

In accordance with embodiments of the present disclosure, methods are provided for transmitting and/or receiving an UL data channel based on preemption for efficiently multiplexing an UL data transmission resource between UEs with different latency requirements.

As usage scenarios provided by the NR and LTE/LTE-A systems, there is increasing importance for an efficient supporting scheme for the URLLC service requiring low-latency/high-reliability, along with the eMBB service to maximize data transmission rate, In particular, in order to satisfy the latency requirement, in the case of UL data transmission for the URLLC, the UL data transmission may be performed by preempting a part of UL data transmission resources already scheduled to (or allocated to) the other UE, in a similar way to the DL case described above. For example, when it is required to perform UL data transmission of an URLLC UE that is sensitive to the latency requirement while UL data transmission is being performed for an eMBB UE, the URLLC UE may transmit the corresponding UL data by preempting a part of UL data transmission resources already scheduled or allocated to the eMBB UE.

To do this, in order to suspend UL data channel (PUSCH) transmission of a UE (e.g., the eMBB UE) that is currently transmitting UL data and in order to support an UL cancellation indication for enabling the corresponding resource is to be used for UL data transmission of the other UE (e.g., the URLLC UE), it is necessary to define specific operating schemes of the UE.

In present disclosure, for convenience of description, the term "UL (uplink) cancellation indication" is used; however, embodiments of the present disclosure are not limited to such a specific term. The UL cancellation indication may be referred to as an UL preemption indication, a discontinuous UL transmission indication, a suspending UL transmission indication, or the like; however, embodiments of the present disclosure are not limited to such terms.

Embodiment 1 Monitoring Information Configuration for an UL Cancellation Indication A UE-specific DCI format for an UL cancellation indication may be defined, as a method for transmitting UL cancellation indication information. In this case, the UL cancellation indication information may be transmitted to each UE through a UE-specific PDCCH transmitted through a UE-specific CORESET or a UE-specific search space for each UE.

A UE-group common DCI format for an UL cancellation indication may be defined, as another method for transmitting UL cancellation indication information. In this case, the UL cancellation indication information may be transmitted to each UE through a UE-group common PDCCH transmitted through a UE-group common CORESET or a UE-group common search space, configured for a UE-group.

Thus, when UL cancellation indication information for a UE is defined as being transmitted through a UE-specific PDCCH or a UE-group common PDCCH, an base station/network may configure monitoring for an UL cancellation indication through UE-specific higher layer signaling or cell-specific/UE-group common higher layer signaling for the UE. In this case, the monitoring configuration for the UL cancellation indication may be performed independently of whether a monitoring configuration for a DL preemption indication is present.

In another embodiment, the UL cancellation indication may be indicated based on a specific sequence, in addition to being transmitted through a PDCCH in the form of DCI (UE-specific or group-common). For example, the specific sequence may be pre-configured, or be configured based on a specific factor, such as a cell ID, a UE ID, a bandwidth, or the like.

Specifically, monitoring configuration information for an UL cancellation indication may include control resource set (CORESET) and search space configuration information for monitoring for corresponding UL cancellation indication information, radio network temporary identifier (RNTI) configuration information, monitoring period configuration information, or the like.

Embodiment 2 An Operating Scheme of a UE when UL Cancellation Indication Information is Received 1. A Scheme of Suspending Remaining PUSCH Transmission A UE that has received the UL cancellation indication information described above may not perform PUSCH transmission in one or more remaining OFDM symbol(s) of resources allocated for on-going PUSCH transmission, that is, to suspend the PUSCH transmission.

Figure 10:
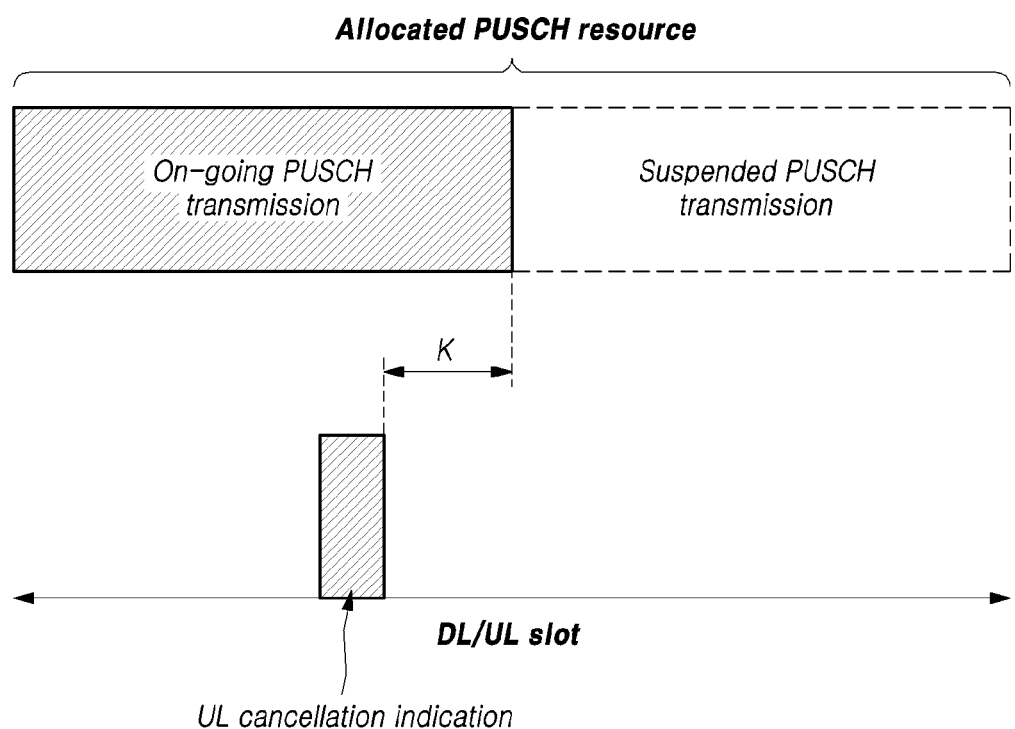
FIG. 10 illustrates an example of UL cancellation in accordance with embodiments of the present disclosure.

Specifically, as illustrated in FIG. 10 below, a UE that has received an UL cancellation indication may suspend all PUSCH transmission after a timing gap, k, corresponding to a pre-configured delay time from a time at which the UL cancellation indication information transmission has been performed. Here, the time at which the UL cancellation indication information transmission has been performed, may mean, for example, a last symbol over which the UL cancellation indication information has been transmitted or an UL symbol corresponding to the last symbol over which the UL cancellation indication information has been transmitted.

At this time, the K value may be set by a base station/network and then transmitted to a UE through explicit signaling. For example, the K value may be set by the base station/network and then transmitted to the UE through UE-specific higher layer signaling or cell-specific/UE-group common higher layer signaling. In another example, the K value may be, for example, dynamically set through L1 control signaling by being included in corresponding UL cancellation indication information and then transmitted to the UE, by the base station/network.

In further another example of defining the K value, the K value may be implicitly set by capabilities of the UE. Or based on this, the base station/network may set it and, as described above, transmit it to the UE through explicit signaling.

In yet another example of defining the K value, the K value may be implicitly determined. For example, the K value may be determined as a function of a numerology or an SCS value of DL or UL. In another example, the K value may be determined as a function of a monitoring period value of a cancellation indication.

In one embodiment, FIG. 10 illustrates performing PUSCH resource allocation within the slot boundary of a slot. That is, in accordance with this case, slot-based or minislot-based PUSCH resource allocation can be performed. A UE may perform PUSCH transmission through a slot allocated for the PUSCH transmission. When an UL cancellation indication is received, the UE may suspend the PUSCH transmission in one or more remaining symbol(s) within the slot boundary of a corresponding slot after a symbol corresponding to a K value, which is a timing gap.

Figure 11:
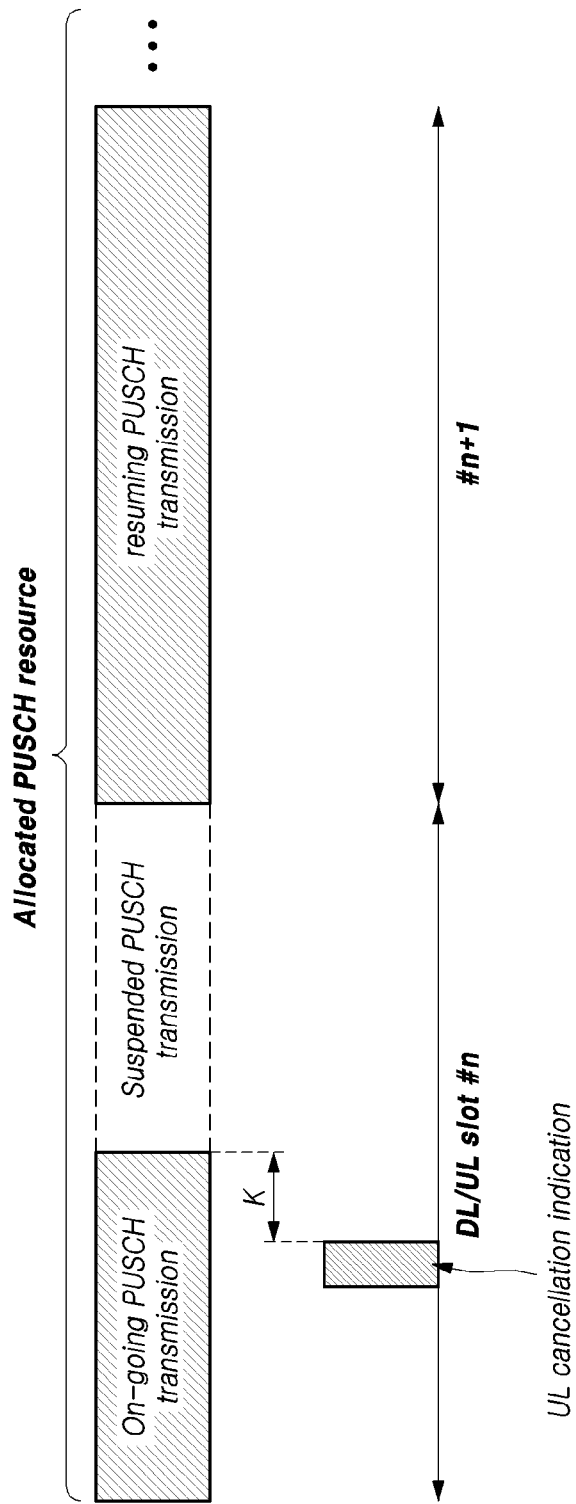
FIG. 11 illustrates another example of UL cancellation in accordance with embodiments of the present disclosure.

In another embodiment, FIG. 11 illustrates performing PUSCH resource allocation based on a plurality of aggregated slots. In this case, a UE may suspend only remaining PUSCH transmission within the slot boundary of a slot (#n) over which UL cancellation indication is received. Thereafter, the UE may normally perform PUSCH transmission through one or more remaining allocated slot(s) (from #n+1).

Figure 12:
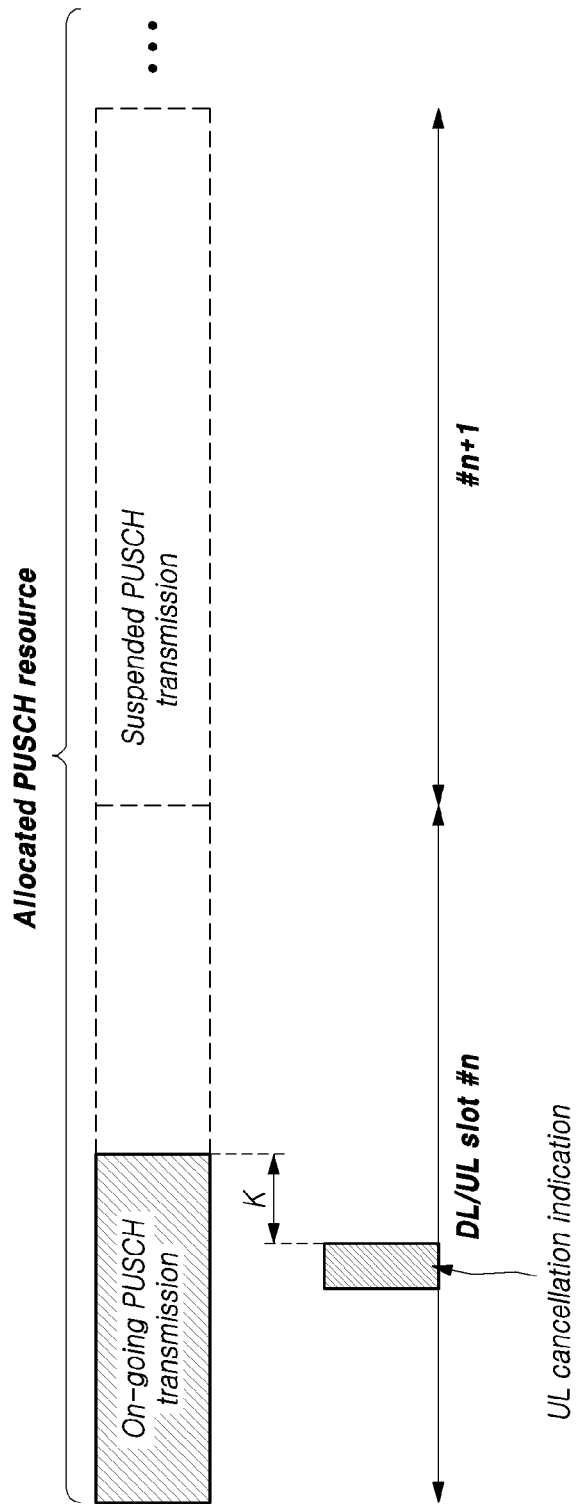
FIG. 12 illustrates further another example of UL cancellation in accordance with embodiments of the present disclosure.

In further another embodiment, FIG. 12 illustrates performing PUSCH resource allocation based on a plurality of aggregated slots. In this case, a UE may suspend all remaining PUSCH transmission for a slot (#n) over which UL cancellation indication is received and aggregated slots therefrom (from #n+1).

2. A Scheme of Suspending PUSCH Transmission Only in a Part of a Time Duration of Remaining PUSCH Transmission As illustrated in FIG. 13, a UE that has received the UL cancellation indication information may suspend PUSCH transmission corresponding to only OFDM symbols corresponding to a part of a time duration for on-going PUSCH transmission.

Figure 13:
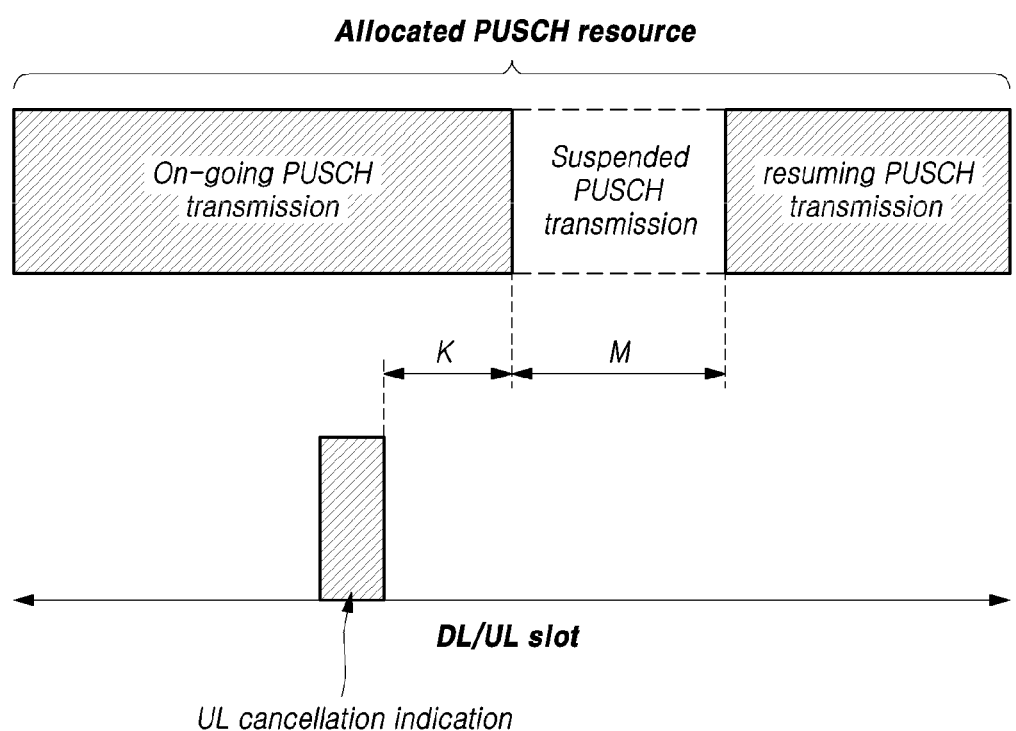
FIG. 13 illustrates yet another example of UL cancellation in accordance with embodiments of the present disclosure.

Specifically, as illustrated in FIG. 13, a UE that has received an UL cancellation indication may suspend PUSCH transmission corresponding to a time duration, M, of PUSCH transmission after a pre-configured timing gap, K, from a time at which corresponding UL cancellation indication information transmission has been performed, and thereafter, resume PUSCH transmission. Here, the time of transmitting the UL cancellation indication information transmission may mean, for example, a last symbol that transmits the UL cancellation indication information, or an UL symbol corresponding to the last symbol that transmits the UL cancellation indication information.

At this time, as described above, the K value may be set by a base station/network and then transmitted to a UE through explicit signaling. For example, the K value may be set by the base station/network and then transmitted to the UE through UE-specific higher layer signaling or cell-specific/UE-group common higher layer signaling. In another example, the K value may be, for example, dynamically set through L1 control signaling by being included in corresponding UL cancellation indication information and then transmitted to the UE, by the base station/network.

In further another example of defining the K value, the K value may be implicitly set by capabilities of the UE. Or, based on this, the base station/network may set it and, as described above, transmit it to the UE through explicit signaling.

In yet another example of defining the K value, the K value may be implicitly determined. For example, the K value may be determined as a function of a numerology or an SCS value of DL or UL, or determined as a function of a monitoring period value of a cancellation indication.

Further, in a similar way to methods of determining the K value described above, the M value, which is a suspending duration, may be set by a base station/network and then transmitted to a UE through explicit signaling. For example, the M value may be set by the base station/network and then transmitted to the UE through UE-specific higher layer signaling or cell-specific/UE-group common higher layer signaling. In another example, the M value may be, for example, dynamically set through L1 control signaling by being included in corresponding UL cancellation indication information and then transmitted to the UE, by the base station/network.

In further another example, the M value may be implicitly set by capabilities of the UE. Or, based on this, the base station/network may set it and, as described above, transmit it to the UE through explicit signaling.

In yet another example of defining the M value, the M value may be implicitly determined. For example, the M value may be determined as a function of a numerology, or an SCS value of DL or UL, or determined as a function of a monitoring period value of the cancellation indication.

Additionally, when PUSCH transmission is resumed after a pre-determined duration has elapsed, the base station/network may perform explicit signaling for this.

Additionally, an OFDM symbol or a symbol may be applicable as a unit for defining the K value or the M value. As a numerology or an SCS value for defining a symbol or a slot boundary, an SCS applied for PUSCH transmission may be used, or an SCS of DL (for example, a PDCCH for UL cancellation indication transmission) may be used.

In one embodiment, the transmission of UL cancellation indication information while a UE performs PUSCH transmission may be performed through a DL. In another embodiment, the transmission of UL cancellation indication information may be performed through a cell adjacent to a cell on which a UE is performing PUSCH transmission. To do this, a multicarrier or carrier aggregation scheme may be used. It should be noted that this is merely one example; therefore, embodiments of the present disclosure are not limited to a specific method in case a UE can receive UL cancellation indication information while performing PUSCH transmission.

According to this, while the UE transmits an UL data channel, in case an UL cancellation indication request for any other UE requiring low latency is invoked, it is possible to fulfill latency requirements because the transmission of an UL channel for the any other UE can be performed with high priority. According to this, since the transmission of an UL channel of a URLLC UE can be performed while an eMBB UE performs UL data channel transmission, it is possible to perform efficiently multiplexing for the URLLC service and the eMBB service.

Figure 14:
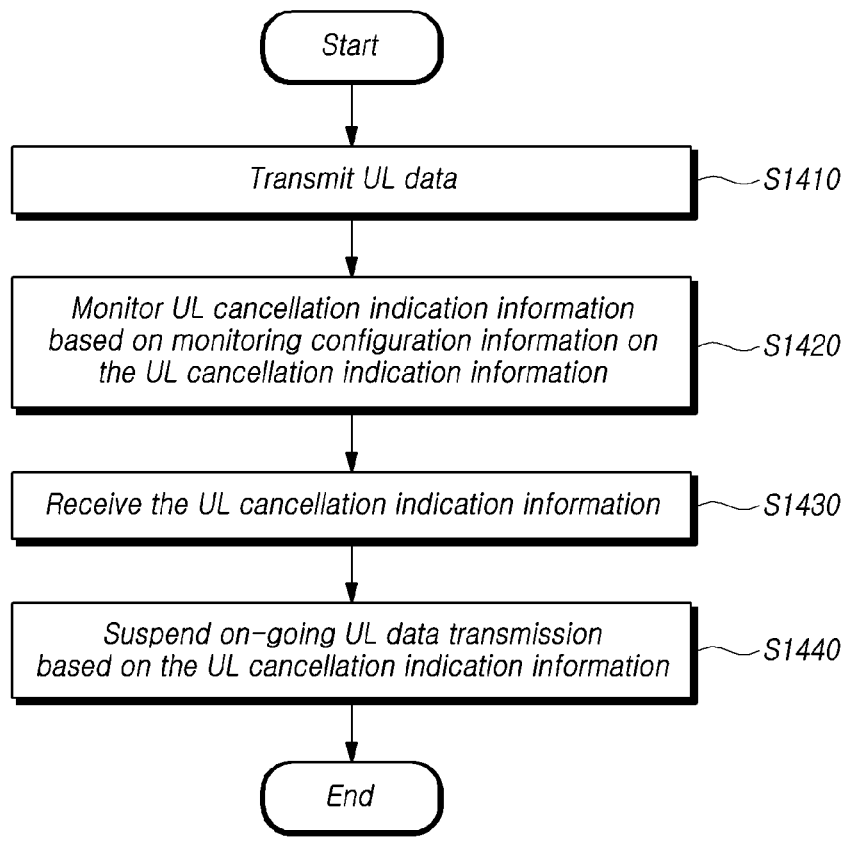
FIG. 14 is a flow diagram illustrating a procedure of a UE for suspending UL data transmission according to UL cancellation indication information in accordance with embodiments of the present disclosure.

FIG. 14 is a flow diagram illustrating a procedure of a UE for suspending UL data transmission according to UL cancellation indication information in accordance with embodiments of the present disclosure.

Referring back to FIG. 14, a UE may transmit UL data based on UL data resource allocation information, at step S1410.

The UE may transmit a PUSCH to a base station according to the allocation information on the UL data resource. In one embodiment, the UE may be a UE using the eMBB service. However, this is a merely example, thus, embodiments of the present disclosure are not limited thereto. A resource for the UL data transmission may be allocated for one slot or a plurality of aggregated slots.

Referring back to FIG. 14, the UE may monitor UL cancellation indication information based on monitoring configuration information for the UL cancellation indication information, at step S1420.

The UE may receive the monitoring configuration information on the UL cancellation indication information from the base station. The monitoring configuration information may be received while the UE performs PUSCH transmission or received irrespective of PUSCH transmission.

The UE may monitor whether the UL cancellation indication information is transmitted based on the monitoring configuration information, while transmitting PUSCH transmission. The monitoring configuration information may include control resource set (CORESET) and search space configuration information, radio network temporary identifier (RNTI) configuration information, monitoring period configuration information, and the like, for monitoring for the UL cancellation indication information.

In one embodiment, with respect to a monitoring period of the UL cancellation indication information, in order to avoid interference on URLLC data to which preemption is requested, it is necessary for a UE (for example, an eMBB UE) that is currently transmitting UL data to suspend corresponding UL data transmission before a URLLC UE for transmitting URLLC data starts UL data transmission. Taking into account 1 ms latency requirement for URLLC traffic, in case subcarrier spacing is short, non-slot level monitoring may be performed for UL cancellation indication information so that an eMBB UE can timely suspend transmission. In one embodiment, the non-slot level monitoring of a PDCCH may be supported by a high-layer parameter, such as monitoringSymbolsWithinSlot.

In one embodiment, in case an UL-specific DCI format is defined for an UL cancellation indication, the UE may monitor a UE-specific PDCCH transmitted through a UE-specific CORESET or a UE-specific search space in order to receive UL cancellation indication information. When the UL cancellation indication information is transmitted through the UE-specific PDCCH, the base station/network may configure (e.g., instruct) the UE to perform monitoring for the UL cancellation indication through UE-specific high layer signaling.

In another embodiment, in case a UE-group common DCI format is defined for an UL cancellation indication, the UE may monitor a UE-group common PDCCH transmitted through a UE-group common CORESET or a UE-group common search space in order to receive UL cancellation indication information. When the UL cancellation indication information is transmitted through the UE-group common PDCCH, the base station/network may configure (e.g., instruct) the UE to perform monitoring for the UL cancellation indication through cell-specific/UE-group common high layer signaling.

In one embodiment, since an UL scheduling slot offset is greater than a time needed for an UL cancellation indication, the UE that is currently transmitting UL data may monitor UL cancellation indication information when scheduling UL transmission. Further, since the UE that is currently transmitting UL data needs a processing time of UL cancellation indication information, in case a last symbol of UL data transmission is earlier than the processing time, the UE may not monitor the UL cancellation indication information.

Accordingly, the UE that is currently transmitting UL data may monitor the UL cancellation indication information during a time period from a reception time of an UL grant to a completion time of the processing of the UL cancellation indication information prior to the last symbol of the UL data transmission. Further, since a starting time of the monitoring may be later than the reception time of the UL grant, a base station may provide information semi-statically or dynamically. According to this, it is possible to reduce power consumption required for monitoring.

Referring back to FIG. 14, the UE may receive the UL cancellation indication information, at step S1430, and suspend on-going UL data transmission based on the UL cancellation indication information, at step S1440.

When the UL cancellation indication information is received, the UE may suspend PUSCH transmission in one or more remaining OFDM symbol(s) that have not been used yet, of resources allocated for on-going PUSCH transmission. In one embodiment, in case the UL cancellation indication is successfully decoded, the UE may suspend the transmission of UL data using a resource over which the transmission is canceled. In this case, the resource over which the transmission is canceled may be allocated for the transmission of an UL channel of any other UE that has requested preemption.

The UE may suspend PUSCH transmission after a pre-configured timing gap, K, from a transmission time of UL cancellation indication information. For example, the UE may suspend PUSCH transmission after the K corresponding to a pre-determined number of symbols from a last symbol that transmits the UL cancellation indication information or an UL symbol corresponding to the last symbol that transmits the UL cancellation indication information.

In one embodiment, the K value, which is a pre-configured timing gap, may be set by a base station/network and then transmitted to the UE through explicit signaling. In another embodiment, the K value may be implicitly set by capabilities of the UE or be set by the capabilities of the UE and then transmitted to the UE through explicit signaling. In further another embodiment, the K value may be implicitly set as a function of a numerology or an SCS value of DL or UL, or be implicitly set as a function of a monitoring period value of a cancellation indication. Accordingly, the K value may include a time taken for the base station to transmit UL cancellation indication information and a time taken for the UE to process the UL cancellation indication information.

In one embodiment, in case a resource for UL data transmission is allocated for one slot, the UE may suspend the UL data transmission within a slot that receives UL cancellation indication information. In this case, one or more remaining symbol(s) within the slot may be used for the UL channel transmission of any other UE that has requested UL preemption.

In one embodiment, in case a resource for UL data transmission is allocated for a plurality of aggregated slots, the UE may suspend the UL data transmission only within a slot over which UL cancellation indication information is received. In another embodiment, the UE may suspend the UL data transmission for all of a plurality of allocated slots, as well as a slot over which UL cancellation indication information is received.

In one embodiment, the UL cancellation indication information may further include information on an M value, which is a pre-configured suspending duration for suspending the transmission of UL data. In one embodiment, the M value, which is a pre-configured suspending duration, may be set by the base station/network and then transmitted to the UE through explicit signaling. In this case, the M value may be set by the base station/network and then transmitted to the UE through UE-specific higher layer signaling. In another embodiment, the M value may be transmitted to the UE through cell-specific/UE-group common higher layer signaling. In further another embodiment, the M value may be, for example, dynamically set through L1 control signaling by being included in corresponding UL cancellation indication information and then transmitted to the UE.

In yet another embodiment, the M value may be implicitly set by capabilities of the UE or be set by the capabilities of the UE and then transmitted to the UE through explicit signaling. In yet another embodiment, the M value may be implicitly set as a function of a numerology or an SCS value of DL or UL or be implicitly set as a function of a monitoring period value of a cancellation indication.

In case information on the M value, which is a suspending duration, is further included in UL cancellation indication information, the UE may suspend UL data transmission during the suspending duration and resume the UL data transmission after the suspending duration has elapsed.

In one embodiment, in case a resource for UL data transmission is allocated for one slot, the UE may suspend the UL data transmission within a slot that receives UL cancellation indication information. In case there are one or more remaining symbol(s) after an M value has elapsed, the UE may resume the UL data transmission for the one or more remaining symbol(s). In one embodiment, in case a resource for UL data transmission is allocated for a plurality of aggregated slots, the UE may transmit UL data for one or more remaining symbol(s) after an M value has elapsed and slots therefrom.

According to this, while the UE transmits an UL data channel, in case an UL cancellation indication request for any other UE requiring low latency is given, it is possible to fulfill latency requirements because an UL channel for the any other UE can be transmitted with high priority.

Figure 15:
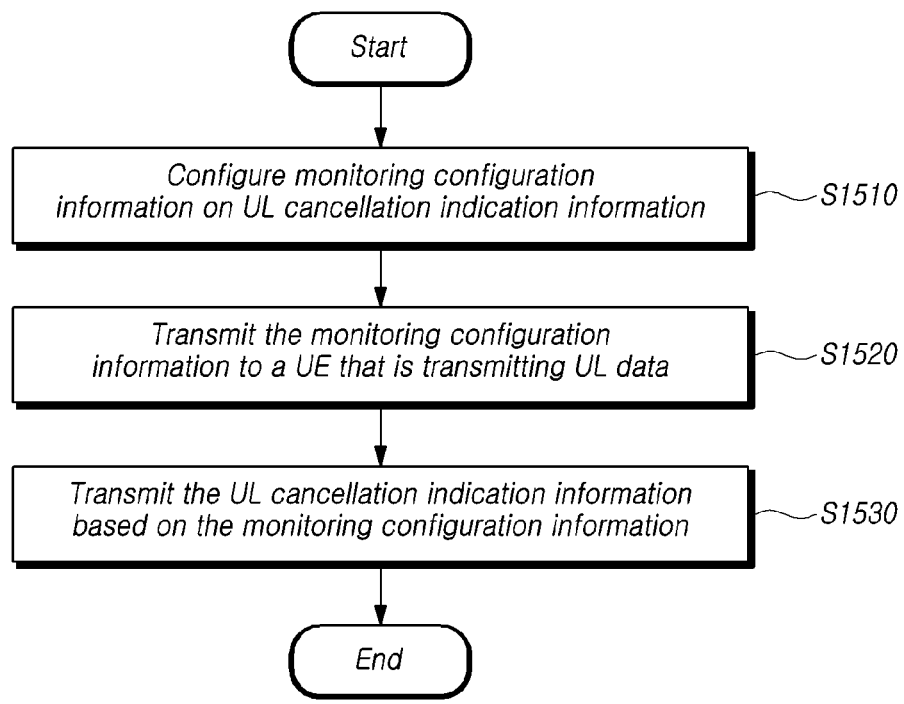
FIG. 15 is a flow diagram illustrating a procedure of a base station for controlling the UL data transmission of a UE according to UL cancellation indication information in accordance with embodiments of the present disclosure.

FIG. 15 is a flow diagram illustrating a procedure of a base station controls the UL data transmission of a UE according to UL cancellation indication information in accordance with embodiments of the present disclosure.

Referring back to FIG. 15, the base station may configure monitoring configuration information for UL cancellation indication information, at step S1510.

In one embodiment, while the base station receives UL data from a UE (e.g., an eMBB UE), the base station may receive a scheduling request (SR) from any other UE (e.g., an URLLC UE) for which low latency is required. The base station may configure UL cancellation indication information for transmitting to a UE (e.g., eMBB UE) that is currently transmitting UL data.

In one embodiment, after the base station have received the SR from a URLLC UE, the base station may decode the SR and prepare an UL grant for the URLLC UE. Thereafter, the base station may configure UL cancellation indication information for the UE that is currently transmitting UL data. In one embodiment, a transmitting time of the UL cancellation indication information may be earlier than or equal to a transmitting time of the UL grant.

In order to satisfy a low latency requirement for the URLLC UE, an UL grant of the URLLC UE and a slot offset between corresponding scheduled PUSCHs may be configured to be smaller than an UL grant of the UE that is currently transmitting UL data and a slot offset between corresponding scheduled PUSCHs, respectively. In another embodiment, a time taken for processing UL cancellation indication information and preparing PUSCH suspending by the UE that is currently transmitting UL data may be configured to be shorter than or equal to a time taken for processing an UL grant and preparing PUSCH transmission by the URLLC UE.

In one embodiment, the UL cancellation indication information may include information on a canceled UL resource. Based on this, the UE that is currently transmitting UL data may timely suspend on-going transmission that has been already scheduled in the canceled UL resource.

In one embodiment, monitoring configuration information may include control resource set (CORESET) and search space configuration information, radio network temporary identifier (RNTI) configuration information, monitoring period configuration information, and the like, for monitoring for the UL cancellation indication information.

Referring back to FIG. 15, the base station may transmit the monitoring configuration information to the UE that is currently transmitting UL data, at step S1520.

In one embodiment, the base station may define a UE-specific DCI format for an UL cancellation indication. In this case, for the UE, the base station may configure monitoring for the UL cancellation indication through UE-specific high layer signaling.

In another embodiment, the base station may define a UE-group common DCI format for an UL cancellation indication. In this case, for the UE, the base station may configure monitoring for the UL cancellation indication through cell-specific/UE-group common high layer signaling.

Referring back to FIG. 15, the base station may transmit the UL cancellation indication information based on the monitoring configuration information, at step 51530.

In case the UL-specific DCI format is defined for the UL cancellation indication, the base station may transmit the UL cancellation indication information through a UE-specific PDCCH transmitted through a UE-specific CORESET or a UE-specific search space.

In case the UL-group common DCI format is defined for the UL cancellation indication, the base station may transmit the UL cancellation indication information through a UE-group common PDCCH transmitted through a UE-group common CORESET or a UE-group common search space.

In one embodiment, UL cancellation indication information may require much higher reliability than DL preemption indication information. This is because the UL cancellation indication information is used to instruct a UE (e.g., an eMBB UE) that is currently transmitting UL data to cancel an on-going or impending PUSCH, before a URLLC UE transmits a PUSCH, while the DL preemption indication information is used to indicate to a UE (e.g., an eMBB UE) that is currently receiving a PDSCH that has been already canceled by the base station. Accordingly, in order to avoid collision with the UE that is currently transmitting UL data and achieve the overall reliability of the URLLC, it is necessary to improve the reliability of UL cancellation indication information.

To do this, in one embodiment, it more time-frequency resources may be allocated for the UL cancellation indication information. For example, a higher aggregation level may be applicable for a PDCCH including UL cancellation indication information. In another example, the reliability of UL cancellation indication information may be improved through frequency repetition or time repetition.

In another embodiment, in order to improve the reliability of UL cancellation indication information, a payload size of UL cancellation indication information may be reduced. For example, even when a URLLC UE occupies a part of a BWP in only a few symbols, one bit may be used to represent entire BWPs within one slot. In case the UE that is currently transmitting UL data initiates PUSCH transmission in a slot over which UL cancellation indication information is received, the UE may suspend the PUSCH transmission in entire BWPs in one or more remaining symbol(s) of the slot. In case the UE that is currently transmitting UL data does not initiate PUSCH transmission, scheduled PUSCH transmission may be canceled.

When the UL cancellation indication information is transmitted, the UE may suspend PUSCH transmission in one or more remaining OFDM symbol(s) that have not been used yet, of resources allocated for on-going PUSCH transmission. The UE may suspend PUSCH transmission after a pre-configured timing gap, K, from a time at which the transmission of UL cancellation indication information has been performed. For example, the UE may suspend PUSCH transmission after the K corresponding to a pre-determined number of symbols from a last symbol of transmitting the UL cancellation indication information or an UL symbol corresponding to the last symbol of transmitting the UL cancellation indication information.

In one embodiment, the K value, which is a pre-configured timing gap, may be set by the base station/network and then transmitted to a UE through explicit signaling. In another embodiment, the K value may be implicitly set by capabilities of a UE or be set by the capabilities of the UE and then transmitted to the UE through explicit signaling. In further another embodiment, the K value may be implicitly set as a function of a numerology or an SCS value of DL or UL, or be implicitly set as a function of a monitoring period value of a cancellation indication. Accordingly, the K value may include a time taken for the base station to transmit UL cancellation indication information and a time taken for a UE to process the UL cancellation indication information.

In one embodiment, in case a resource for UL data transmission is allocated for one slot, a UE may suspend the UL data transmission within a slot that receives UL cancellation indication information. In this case, one or more remaining symbol(s) within the slot may be used for the UL channel transmission of any other UE that has requested UL preemption.

In one embodiment, in case a resource for UL data transmission is allocated for a plurality of aggregated slots, a UE may suspend the UL data transmission only within a slot that receives UL cancellation indication information. In another embodiment, the UE may suspend the UL data transmission for all of a plurality of allocated slots, as well as a slot that receives UL cancellation indication information.

In one embodiment, the UL cancellation indication information may further include information on an M value, which is a pre-configured suspending duration for suspending the transmission of UL data. In one embodiment, the M value, which is a pre-configured suspending duration, may be set by the base station/network and then transmitted to a UE through explicit signaling. In this case, the M value may be set by the base station/network and then transmitted to the UE through UE-specific higher layer signaling. In another embodiment, the M value may be transmitted to a UE through cell-specific/UE-group common higher layer signaling. In further another embodiment, the M value may be, for example, dynamically set through L1 control signaling by being included in corresponding UL cancellation indication information and then transmitted to a UE.

In yet another embodiment, the M value may be implicitly set by capabilities of a UE or be set by the capabilities of the UE and then transmitted to the UE through explicit signaling. In yet another embodiment, the M value may be implicitly set as a function of a numerology or an SCS value of DL or UL, or be implicitly set as a function of a monitoring period value of a cancellation indication.

In case information on the M value, which is a suspending duration, is further included in UL cancellation indication information, a UE may suspend UL data transmission during the suspending duration and resume the UL data transmission after the suspending duration has elapsed.

In one embodiment, in case a resource for UL data transmission is allocated for one slot, a UE may suspend the UL data transmission within a slot that receives UL cancellation indication information. In case there are one or more remaining symbol(s) after an M value has elapsed, the UE may resume the UL data transmission for the one or more remaining symbol(s). In one embodiment, in case a resource for UL data transmission is allocated for a plurality of aggregated slots, a UE may transmit UL data for one or more remaining symbol(s) after an M value has elapsed and slots therefrom.

When a UE that is transmitting a PUSCH suspends the PUSCH transmission, the base station may allocate one or more remaining resource(s) of resources allocated for the UE to any other UE (e.g., a UE using the URLLC service) to which preemption is requested. Thereafter, the base station may receive UL data etc. from the UE to which preemption is requested through the one or more allocated resource(s).

According to this, while a UE transmits an UL data channel, in case an UL cancellation indication request for any other UE requiring low latency is invoked, it is possible to fulfill latency requirements because the transmission of an UL channel for the any other UE can be performed with high priority.

Figure 16:
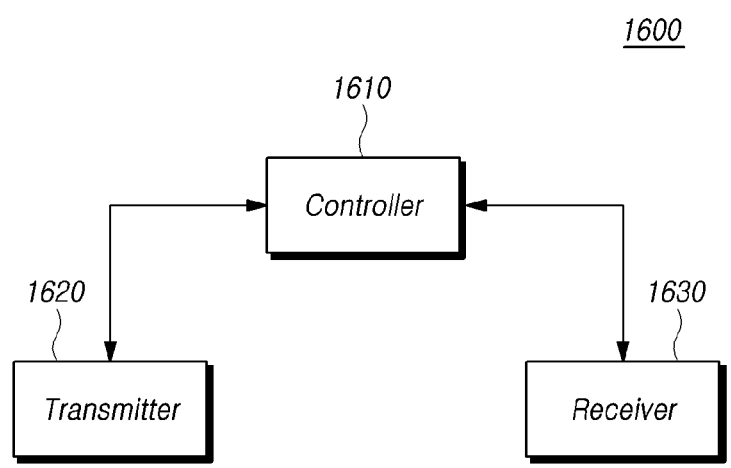
FIG. 16 is a block diagram illustrating a base station in accordance with embodiments of the present disclosure.

FIG. 16 is a block diagram illustrating a base station 1600 in accordance with embodiments of the present disclosure.

Referring to FIG. 16, the base station 1600 includes a controller 1610, a transmitter 1620, and a receiver 1630.

The controller 1610 controls overall operations of the base station 1600 needed to perform methods of controlling UL data transmission of a UE according to the embodiments of the present disclosure described above.

The controller 1610 may configure monitoring configuration information for UL cancellation indication information. The monitoring configuration information may include control resource set (CORESET) and search space configuration information, radio network temporary identifier (RNTI) configuration information, monitoring period configuration information, and the like, for monitoring for the UL cancellation indication information.

The controller 1610 may define a UE-specific DCI format for an UL cancellation indication. In another embodiment, the controller 1610 may define a UE-group common DCI format for an UL cancellation indication.

The transmitter 1620 is used to transmit signals, messages, and data needed for carrying out the embodiments described above to a UE. The receiver 1630 is used to receive signals, messages, and data needed for carrying out the embodiments described above from a UE.

The transmitter 1620 may transmit the monitoring configuration information to a UE that is currently transmitting UL data. In case the UE-specific DCI format is defined for the UL cancellation indication, the transmitter 1620 may transmit the monitoring configuration information for the UL cancellation indication through UE-specific higher layer signaling for the UE. In further another embodiment, in case the UE-group common DCI format is defined for the UL cancellation indication, the transmitter 1620 may transmit the monitoring configuration information for the UL cancellation indication through cell-specific/UE-group common higher layer signaling for the UE.

The transmitter 1620 may transmit the UL cancellation indication Information based on the monitoring configuration information. In case the UL-specific DCI format is defined for the UL cancellation indication, the transmitter 1620 may transmit the UL cancellation indication information through a UE-specific PDCCH transmitted through a UE-specific CORESET or a UE-specific search space.

In case the UL-group common DCI format is defined for the UL cancellation indication, the transmitter 1620 may transmit the UL cancellation indication information through a UE-group common PDCCH transmitted through a UE-group common CORESET or a UE-group common search space.

When the UL cancellation indication information is transmitted, the UE may suspend PUSCH transmission in one or more remaining OFDM symbol(s) that have not been used yet, of resources allocated for on-going PUSCH transmission. The UE may suspend PUSCH transmission after a pre-configured timing gap, K, from a time at which the transmission of UL cancellation indication information has been performed. For example, the UE may suspend PUSCH transmission after the K corresponding to a pre-determined number of symbols from a last symbol over which the UL cancellation indication information has been transmitted or an UL symbol corresponding to the last symbol over which the UL cancellation indication information has been transmitted.

In one embodiment, the K value, which is a pre-configured timing gap, may be set by the base station/network and then transmitted to a UE through explicit signaling. In another embodiment, the K value may be implicitly set by capabilities of a UE, or be set by the capabilities of the UE and then transmitted to the UE through explicit signaling. In further another embodiment, the K value may be implicitly set as a function of a numerology or an SCS value of DL or UL, or be implicitly set as a function of a monitoring period value of a cancellation indication. Accordingly, the K value may include a time taken for the base station to transmit UL cancellation indication information and a time taken for a UE to process the UL cancellation indication information.

In one embodiment, in case a resource for UL data transmission is allocated for one slot, a UE may suspend the UL data transmission within a slot that receives UL cancellation indication information. In this case, one or more remaining symbol(s) within the slot may be used for the UL channel transmission of any other UE that has requested UL preemption.

In one embodiment, in case a resource for UL data transmission is allocated for a plurality of aggregated slots, a UE may suspend the UL data transmission only within a slot that receives UL cancellation indication information. In another embodiment, the UE may suspend the UL data transmission for all of a plurality of allocated slots, as well as a slot over which UL cancellation indication information is received.

In one embodiment, the UL cancellation indication information may further include information on an M value, which is a pre-configured suspending duration for suspending the transmission of UL data. In one embodiment, the M value, which is a pre-configured suspending duration, may be set by the base station/network and then transmitted to a UE through explicit signaling. In this case, the M value may be set by the base station/network and then transmitted to the UE through UE-specific higher layer signaling. In another embodiment, the M value may be transmitted to a UE through cell-specific/UE-group common higher layer signaling. In further another embodiment, the M value may be, for example, dynamically set through L1 control signaling by being included in corresponding UL cancellation indication information and then transmitted to a UE.

In yet another embodiment, the M value may be implicitly set by capabilities of a UE or be set by the capabilities of the UE and then transmitted to the UE through explicit signaling. In yet another embodiment, the M value may be implicitly set as a function of a numerology or an SCS value of DL or UL or be implicitly set as a function of a monitoring period value of a cancellation indication.

In case information on the M value, which is a suspending duration, is further included in UL cancellation indication information, the UE may suspend UL data transmission during the suspending duration and resume the UL data transmission after the suspending duration has elapsed.

In one embodiment, in case a resource for UL data transmission is allocated for one slot, the UE may suspend the UL data transmission within a slot that receives UL cancellation indication information. In case there are one or more remaining symbol(s) after an M value has elapsed, the UE may resume the UL data transmission for the one or more remaining symbol(s). In one embodiment, in case a resource for UL data transmission is allocated for a plurality of aggregated slots, the UE may transmit UL data for one or more remaining symbol(s) after an M value has elapsed and slots therefrom.

When the UE that is transmitting a PUSCH suspends the PUSCH transmission, the controller 1610 may allocate one or more remaining resource(s) of resources allocated for the UE to any other UE (e.g., a UE using the URLLC service) to which preemption is requested. Thereafter, the receiver 1630 may receive UL data etc. from the UE to which preemption is requested through the one or more allocated resource(s).

According to this, while a UE transmits an UL data channel, in case an UL cancellation indication request for any other UE requiring low latency is invoked, it is possible to fulfill latency requirements because the transmission of an UL channel for the any other UE can be performed with high priority.

Figure 17:
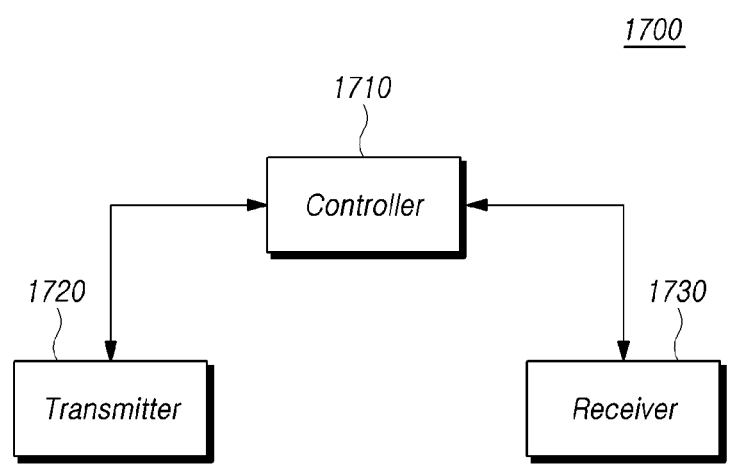
FIG. 17 is a block diagram illustrating a UE in accordance with embodiments of the present disclosure.

FIG. 17 is a block diagram illustrating a UE 1700 in accordance with embodiments of the present disclosure.

Referring to FIG. 17, a UE 1700 according to another embodiment includes a receiver 1710, a controller 1720, and a transmitter 1730.

The transmitter 1730 transmits UL control information, data, and messages through a corresponding channel to a base station. The transmitter 1730 may transmit UL data based on UL data resource allocation information.

The receiver 1710 receives DL control information, data, and messages through a corresponding channel from the base station. The receiver 1710 may receive monitoring configuration information on UL cancellation indication information from the base station. The monitoring configuration information may be received while the UE performs PUSCH transmission, or received irrespective of PUSCH transmission.

The monitoring configuration information may include control resource set (CORESET) and search space configuration information, radio network temporary identifier (RNTI) configuration information, monitoring period configuration information, and the like, for monitoring for the UL cancellation indication information.

The receiver 1710 may receive the UL cancellation indication information based on a result from the monitoring of the controller 1720.

The controller 1720 controls overall operations of the UE 1700 needed to perform methods of transmitting UL data according to the embodiments of the present disclosure described above.

The controller 1720 may monitor the UL cancellation indication information based on the monitoring configuration information for the UL cancellation indication information.

In one embodiment, in case an UL-specific DCI format is defined for an UL cancellation indication, the controller 1720 may monitor a UE-specific PDCCH transmitted through a UE-specific CORESET or a UE-specific search space in order to receive UL cancellation indication information. When the UL cancellation indication information is transmitted through the UE-specific PDCCH, the base station/network may configure the UE to perform monitoring for the UL cancellation indication through UE-specific high layer signaling.

In another embodiment, in case a UE-group common DCI format is defined for an UL cancellation indication, the controller 1720 may monitor a UE-group common PDCCH transmitted through a UE-group common CORESET or a UE-group common search space in order to receive UL cancellation indication information. When the UL cancellation indication information is transmitted through the UE-group common PDCCH, the base station/network may configure the UE to perform monitoring for the UL cancellation indication through cell-specific/UE-group common high layer signaling.

The controller 1720 may suspend on-going UL data transmission based on the UL cancellation indication information. When the UL cancellation indication information is received, the controller 1720 may suspend PUSCH transmission in one or more remaining OFDM symbol(s) that have not been used yet, of resources allocated for on-going PUSCH transmission. The controller 1720 may suspend PUSCH transmission after a pre-configured timing gap, K, from a time of transmitting UL cancellation indication information. For example, the controller 1720 may suspend PUSCH transmission after the K corresponding to a predetermined number of symbols from a last symbol that transmits the UL cancellation indication information or an UL symbol corresponding to the last symbol that transmits the UL cancellation indication information.

In one embodiment, the K value, which is a pre-configured timing gap, may be set by a base station/network and then transmitted to the UE 1700 through explicit signaling. In another embodiment, the K value may be implicitly set by capabilities of the UE 1700 or be set by the capabilities of the UE 1700 and then transmitted to the UE through explicit signaling. I n further another embodiment, the K value may be implicitly set as a function of a numerology or an SCS value of DL or UL, or be implicitly set as a function of a monitoring period value of a cancellation indication. Accordingly, the K value may include a time taken for the base station to transmit UL cancellation indication information and a time taken for the UE 1700 to process the UL cancellation indication information.

In one embodiment, in case a resource for UL data transmission is allocated for one slot, the controller 1720 may suspend the UL data transmission within a slot of receiving UL cancellation indication information. In this case, one or more remaining symbol(s) within the slot may be used for the UL channel transmission of any other UE that has requested UL preemption.

In one embodiment, in case a resource for UL data transmission is allocated for a plurality of aggregated slots, the controller 1720 may suspend the UL data transmission only within a slot that receives UL cancellation indication information. In another embodiment, the controller 1720 may suspend the UL data transmission for all of a plurality of allocated slots, as well as a slot that receives UL cancellation indication information.

In one embodiment, the UL cancellation indication information may further include information on an M value, which is a pre-configured suspending duration for suspending the transmission of UL data. In one embodiment, the M value, which is a pre-configured suspending duration, may be set by a base station/network and then transmitted to the UE 1700 through explicit signaling. In this case, the M value may be set by the base station/network and then transmitted to the UE through UE-specific higher layer signaling. In another embodiment, the M value may be transmitted to the UE 1700 through cell-specific/UE-group common higher layer signaling. In further another embodiment, the M value may be, for example, dynamically set through L1 control signaling by being included in corresponding UL cancellation indication information and then transmitted to the UE.

In another embodiment, the M value may be implicitly set by capabilities of the UE 1700 or be set by the capabilities of the UE 1700 and then transmitted to the UE 1700 through explicit signaling. In yet another embodiment, the M value may be implicitly set as a function of a numerology or an SCS value of DL or UL, or be implicitly set as a function of a monitoring period value of a cancellation indication.

In case information on the M value, which is a suspending duration, is further included in UL cancellation indication information, the controller 1720 may suspend UL data transmission during the suspending duration and resume the UL data transmission after the suspending duration has elapsed.

In one embodiment, in case a resource for UL data transmission is allocated for one slot, the controller 1720 may suspend the UL data transmission within a slot that receives UL cancellation indication information. In case there are one or more remaining symbol(s) after an M value has elapsed, the controller 1720 may resume the UL data transmission for the one or more remaining symbol(s). In one embodiment, in case a resource for UL data transmission is allocated for a plurality of aggregated slots, the controller 1720 may transmit UL data for one or more remaining symbol(s) after an M value has elapsed and slots therefrom.

According to this, while the UE transmits an UL data channel, in case an UL cancellation indication request for any other UE requiring low latency is invoked, it is possible to fulfill latency requirements because the transmission of an UL channel for the any other UE can be performed with high priority.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above-described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above-described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the present disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the present disclosure shall be construed on the basis of the accompanying claims in such a manner that all of the technical ideas included within the scope equivalent to the claims belong to the present disclosure.

What is claimed is:

1. A method of a user equipment (UE) for receiving uplink (UL) indication, the method comprising:
   receiving, through a higher layer signaling, configuration information for monitoring the UL indication; and
   receiving the UL indication based on the configuration information,
   wherein a transmission of UL data is not performed based on the received UL indication,
   wherein the configuration information comprises radio network temporary identifier (RNTI) information for monitoring the UL indication, and
   wherein the RNTI information is associated with at least one of control resource set (CORESET) and search space configuration information, or period configuration information, for monitoring for the UL indication.

2. The method according to claim 1, wherein the UL indication is indicated through UE-group common downlink control information (DCI).

3. The method according to claim 1, wherein the transmission of the UL data is not performed after a certain time duration has elapsed based on receiving the UL indication.

4. The method according to claim 1, further comprising:
   transmitting the UL data based on UL data resource allocation information,
   wherein the transmission of the UL data is not performed within a slot that receives the UL indication or for all of a plurality of slots allocated based on the UL data resource allocation information.

5. The method according to claim 1, wherein the UL indication includes information on a suspending duration for suspending the transmission of the UL data, and
   wherein the suspending of the transmission of the UL data is performed during the suspending duration, and the transmission of the UL data is resumed after the suspending duration has elapsed.

6. A method of a base station for transmitting uplink (UL) indication to a user equipment (UE), the method comprising:
   transmitting, through a higher layer signaling, configuration information for monitoring the UL indication to the UE; and
   transmitting the UL indication based on the configuration information,
   wherein the UL indication is used to prevent a transmission of UL data by the UE,
   wherein the configuration information comprises radio network temporary identifier (RNTI) information for monitoring the UL indication by the UE, and
   wherein the RNTI information is associated with at least one of control resource set (CORESET) and search space configuration information, or period configuration information, for monitoring for the UL indication.

7. The method according to claim 6, wherein the UL indication is indicated through UE-group common downlink control information (DCI).

8. The method according to claim 6, wherein the transmission of the UL data is not performed by the UE after a certain time duration has elapsed based on receiving the UL indication by the UE.

9. The method according to claim 6, further comprising:
   receiving the UL data based on UL data resource allocation information,
   wherein the transmission of the UL data is not performed by the UE within a slot over which the UL indication has been received or for all of a plurality of slots allocated based on the UL data resource allocation information.

10. The method according to claim 6, wherein the UL indication includes information on a suspending duration for suspending the transmission of the UL data, and
    wherein the transmission of the UL data is not performed by the UE during the suspending duration, and the transmission of the UL data is resumed after the suspending duration has elapsed.

11. A user equipment (UE) for receiving uplink (UL) indication, the UE comprising:
    a receiver configured to receive, through a higher layer signaling, configuration information for monitoring the UL indication, and receive the UL indication based on the configuration information; and
    a controller configured to prevent a transmission of UL data based on the received UL indication,
    wherein the configuration information comprises radio network temporary identifier (RNTI) information for monitoring the UL indication, and wherein the RNTI information is associated with at least one of control resource set (CORESET) and search space configuration information, or period configuration information, for monitoring for the UL indication.

12. The UE according to claim 11, wherein the UL indication is indicated through UE-group common downlink control information (DCI).

13. The UE according to claim 11, wherein the transmission of the UL data is not performed after a certain time duration has elapsed based on receiving the UL indication.

14. The UE according to claim 11, further comprising:
a transmitter configured to transmit the UL data based on UL data resource allocation information,
wherein the transmission of the UL data is not performed within a slot that receives the UL indication or for all of a plurality of slots allocated based on the UL data resource allocation information.

15. The UE according to claim 11, wherein the UL indication includes information on a suspending duration for suspending the transmission of the UL data, and
wherein the controller suspends the transmission of the UL data during the suspending duration, and resumes the transmission of the UL data after the suspending duration has elapsed.

* * * * *